May 8, 1945.　　　W. F. CALDWELL　　　2,375,729

AGITATING AND DISSOLVING APPARATUS

Filed June 6, 1942

INVENTOR.
WILLIAM F. CALDWELL,
BY
Harvey W. Edelblute
ATTORNEY.

Patented May 8, 1945

2,375,729

UNITED STATES PATENT OFFICE 2,375,729

AGITATING AND DISSOLVING APPARATUS

William F. Caldwell, Old Greenwich, Conn., assignor to American Cyanamid Company, New York, N. Y., a corporation of Maine Application June 6, 1942, Serial No. 446,157

1 Claim. (Cl. 23—272.6)

This invention relates to apparatus particularly adapted for use in agitating and dissolving materials in liquids under high pressure conditions.

In chemical operations it is frequently necessary to dissolve a chemical substance, or substances, in a solvent maintained under high pressure. Some solvents, particularly liquid ammonia, boil below normal room temperatures and must be kept under pressure to keep them from vaporizing. Also, it is frequently desirable to employ some solvents at elevated temperatures which may be above their boiling point and hence must be kept under pressure. In order to dissolve a material within a reasonable time agitation of the mixture is usually necessary. In such cases, closed pressure vessels such as autoclaves of conventional design are ordinarily employed as dissolving apparatus and such vessels are fitted with agitation means driven by a motor positioned outside the vessel. This construction requires the use of packing glands where the agitator shaft enters the dissolving vessel and when using penetrating solvents or those of low viscosity or highly corrosive it is extremely difficult to maintain packing tight enough to prevent leakage from the vessel. Making the packing tighter increases the friction on the agitator shaft making the power requirements for agitation undesirably high and also increasing the wear on the shaft.

One of the objects of the present invention is to avoid these difficulties by providing an apparatus suitable for agitating and dissolving materials in solvents under high pressure. Another object of the invention is to provide an agitating and dissolving apparatus which avoids the use of externally driven mechanical agitators with their troublesome packing problems. Still another object of the invention is to provide effective means for dissolving organic or inorganic substances in liquid ammonia and other highly volatile solvents. Other objects of my invention will appear hereinafter.

My invention will now be described by reference to the drawing in which.

Figure 1:
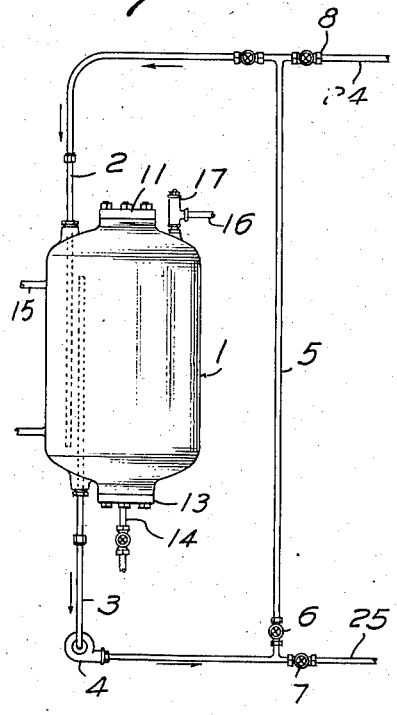
Figure 1 is an elevational view of the apparatus comprising the present invention.

As shown in Figure 1 my improved dissolving apparatus inculdes a tank 1, with inlet line 2, outlet line 3, circulating pump 4, recycling line 5 with suitable valves 6, 7, and 8 to control the flow of recycle liquor. Details of the dissolving tank itself may be seen more clearly from an inspection of Figure 2.

Figure 2:
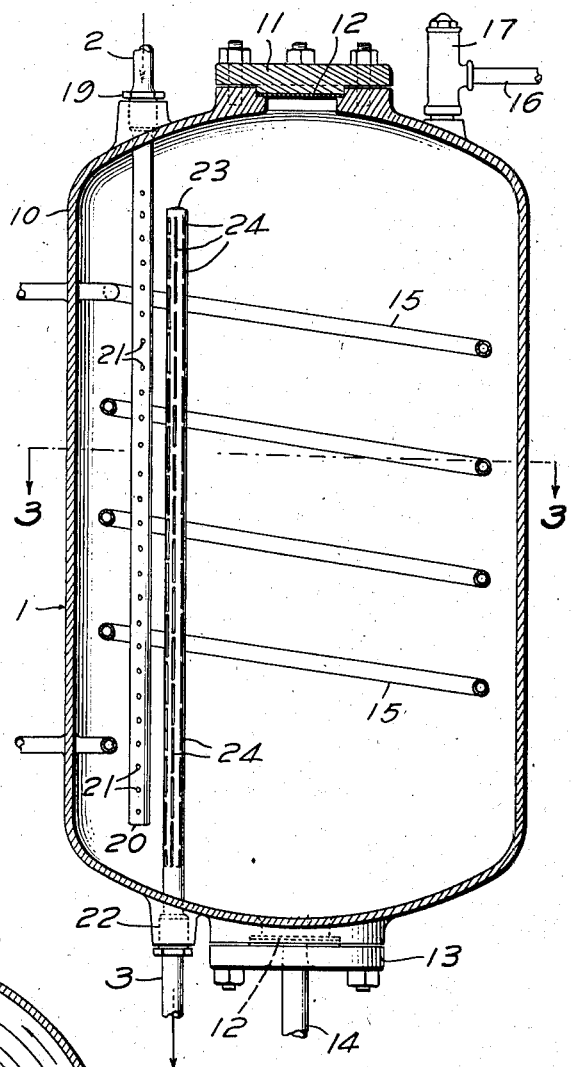
Figure 2 is a vertical section of the dissolving tank of the present invention showing the interior construction thereof.

As seen in Figure 2 the walls 10 of the tank are strongly built so as to withstand the high pressures which must be used to keep solvents such as ammonia in liquid condition. An easily removable cover 11 with sealing gasket 12 is provided on the tank to permit the introduction of solid materials. At the lower end of the tank a similar closure 13 is provided. A supplementary outlet 14 through the lower closure, may be provided for flushing out the tank, or for the occasional removal of a sample of the liquid contents. Heating or cooling coils 15 may be placed in the tank if desired. A pressure relief line 16 with an adjustable pressure relief valve 17 of appropriate design may also be provided as a safety measure.

The inlet line 2 enters the dissolver as shown through a bushing 19 welded to the inlet pipe which is in turn tightly screwed into a hole tapped in the tank as shown. Inside the dissolver the inlet pipe is positioned substantially parallel to the axis of the tank and is preferably close to its wall. The inlet pipe is closed at its lower end 20 and has a series of spaced openings 21 drilled in it as shown in the drawing in such a way that the liquid passing into the dissolver is forced from the inlet pipe in a strong stream substantially tangential to the walls of the tank. Although a single row of drilled holes is shown it will be obvious that slits or holes of other shapes may be provided and positioned so as to discharge the incoming liquor in a tangential direction with respect to the walls of the dissolver.

The outlet line 3 passes into the dissolver from the bottom at 22 as shown in the drawing. This outlet pipe is also positioned substantially parallel with the axis of the tank, is closed at its end 23 and has a number of spaced outlet holes 24 positioned somewhat as shown. These outlets may be slits as in the drawing, may be drilled holes, or when the material being dissolved is of small particle size, the pipe with suitable perforations therein, may be covered with filter cloth of cotton, stainless steel, fabricated glass, or other corrosion resistant material.

Figure 3:
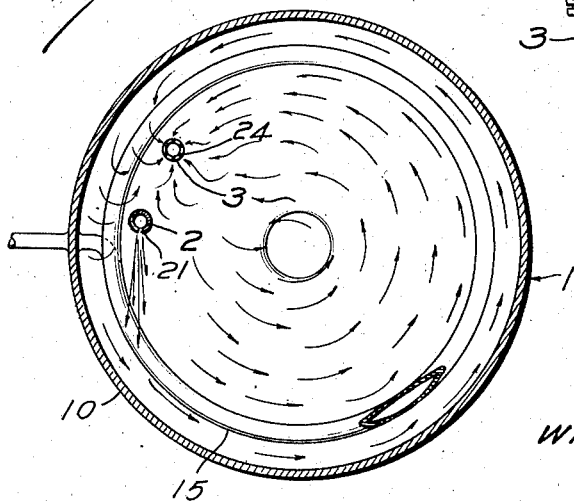
Figure 3 is a horizontal section taken on the line 3—3 of Figure 2.

Figure 3 shows the relative position of the inlet pipe 2 with respect to outlet pipe 3 in the tank. As will be noted from this figure liquor is discharged from the outlet holes 21 substantially parallel to the walls of the tank. Each of the outlet holes acts as a small nozzle creating a high velocity flow of liquor from the inlet pipe and causes a vigorous swirling motion of the liquid contents in the tank. This swirling motion serves to agitate the contents of the tank, keep the solids in suspension, and hastens the dissolving action of the solvent. It is therefore unnecessary to employ additional mechanical agitation means. After passing around the tank in somewhat the manner indicated by the flow arrows the liquor passes through openings in the outlet pipe and out of the dissolver. The solution may then be recirculated through the system again by pump 4 through lines 5 and 2 until the solid material in the tank has been dissolved.

Operation of my apparatus with particular reference to the process of dissolving dicyandiamide in liquid ammonia will now be described. A weighed amount of dicyandiamide is placed in the dissolving tank and the cover is then tightly closed. Liquid ammonia from a source not shown may be introduced into the tank through line 24, valve 8, and line 2. When the desired quantity of ammonia has been introduced into the tank and valve 8 is closed, valve 6 is opened and circulating pump 4 started. Ammoniacal liquor is withdrawn through line 3 and circulated through valve 6, line 5 and back into the tank through the inlet pipe 2. As the liquor circulates through the system a swirling motion of the contents of the tank is created and maintained which causes the dicyandiamide to be rapidly dissolved. When the dicyandiamide has been dissolved as may be indicated by withdrawal of a sample of the liquor, or as will be known from experience in handling the apparatus, valve 7 may be opened, valve 6 closed and the liquor pumped through line 25 to a reaction vessel or wherever desired.

As will be seen from the foregoing, my improved agitating and dissolving apparatus provides a simple, inexpensive, safe and effective means of dissolving solids in liquids which must be maintained under pressure. Absence of packing glands, except a small easily maintained one at the circulating pump, makes it possible to handle highly volatile, penetrating, and corrosive liquids in a safe manner. As will be obvious many different solvents may be handled in the apparatus, for example, liquid $NH_3$, liquid $SO_2$, alcohol, carbon tetrachloride, hot water, benzene, petroleum naptha, and others of similar character. As will also be obvious changes may be made in the form of the apparatus as particularly described without departing from the advantages and novel features thereof and I intend that my invention be construed as broadly as the appended claim permits.

What I claim is:

An apparatus for dissolving solid material in a solvent comprising a substantially cylindrical vessel, a tubular outlet member extending into said vessel adjacent the wall and substantially parallel to the axis thereof having a plurality of screening openings along its extent, an inlet tube extending into the vessel positioned substantially parallel to the vertical axis of the vessel and adjacent said tubular member and the wall of the vessel, closed at its end, and having a plurality of openings along its extent so directed as to discharge in a direction tangential to the wall and away from said outlet tubular member.

WILLIAM F. CALDWELL.